United States Patent
Cruce

(10) Patent No.: US 6,224,929 B1
(45) Date of Patent: May 1, 2001

(54) COMESTIBLE CLEANING PROCESS

(76) Inventor: Christopher J. Cruce, 13100 Kirkham Rd. #202, Poway, CA (US) 91910

(*) Notice: Subject to any disclaimer, the term of this patent is extended or adjusted under 35 U.S.C. 154(b) by 0 days.

(21) Appl. No.: 09/420,300

(22) Filed: Oct. 18, 1999

(51) Int. Cl.⁷ .................................................. A23B 5/00
(52) U.S. Cl. ........................... 426/298; 926/300; 15/3.1; 15/3.12
(58) Field of Search .................... 426/298, 300; 15/3.1, 3.12

(56) References Cited

U.S. PATENT DOCUMENTS

| | | |
|---|---|---|
| 4,033,461 * | 7/1977 | Nevai . |
| 4,834,125 * | 5/1989 | Insalaco . |
| 5,069,360 * | 12/1991 | Dingler et al. . |
| 5,858,116 * | 1/1999 | Kim . |
| 5,881,906 * | 3/1999 | Rogers et al. . |

* cited by examiner

*Primary Examiner*—Anthony J. Weier
(74) *Attorney, Agent, or Firm*—Bernard L. Kleinke; Foley & Lardner

(57) ABSTRACT

A new and improved cleaning method and apparatus facilitates a more thorough cleaning of delicate comestibles such as eggs. The process includes using an open frame basket composed of thermoplastic or thermoset material to help prevent damage to the comestibles. The side wall of the basket has openings defined by axial and peripheral impact absorbing liquid-deflecting ribs. Once the comestibles to be cleaned are confined within the basket, a cleaning fluid under pressure is deflected from the ribs at the outer surface of the walls and into the openings to cause an agitation of the fluid to clean more thoroughly the comestibles confined therein. The side wall openings are critically dimensioned to be sufficiently small to retain the comestibles within the basket and sufficiently large to permit adequate agitation of the fluid entering the basket.

7 Claims, 1 Drawing Sheet

COMESTIBLE CLEANING PROCESS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a comestible cleaning process, and it more particularly relates to a method of cleaning delicate comestibles such as eggs to avoid or greatly, reduce the possibility of breakage or damage during the cleaning process or transportation.

2. Background Art

There have been a variety of different cleaning processes for different types and kinds of objects to be cleaned and containers or the like for confining objects. For example, reference may be made to U.S. Pat. Nos. D 283,363; 2,528,404; 2,793,761; 3,760,823; 3,794,053; 3,935,958; 4,056,114; 4,058,233; 4,830,200; 5,404,610; 5,453,039; 5,456,357; 5,660,784; 5,850,542; 5,858,116; and 5,876,513. As disclosed in the foregoing patents, such processes and apparatus relate, at least in part, to emersing a porous container in a cleaning solution, or the possibility of different materials for corrosion resistance spraying a cleaning solution onto the objects to be cleaned.

When it is desirable to clean delicate comestibles such as eggs, foregoing patented processes would not be entirely satisfactory. It is undesirable to emerse the eggs in a harsh cleaning solution, which may be effective to remove debris but could damage the delicate egg shell, or at least be an undesirable pollutant being applied to it. Furthermore, such cleansing solutions may cause damage to the container. Also, the high pressure spraying processes for cleaning utensils and other objects in a washer such as a dishwasher, would not be acceptable for use in cleaning easily damaged eggs.

One simple technique or expedient for cleansing eggs has been to employ an open top wire frame basket for collecting the eggs, and then spraying the eggs in the wire basket to dislodge debris and the like for an initial or superficial cleaning process. However, the wires forming the basket can damage or crack the delicate egg shells when subjected to the spraying of a liquid such as water under pressure against the wire basket. In this regard, the eggs can be moved about within the basket and against the hard wires forming the basket. Also, the wire can deform inwardly through use and engage the eggs to damage them during transporting of the eggs.

Such a cleaning technique is not very thorough or complete, since the eggs are closely spaced and compacted within the wire basket. By spraying the eggs through the openings in the wire basket, the water under pressure does not thoroughly and completely come into contact with all or even an adequate number of the eggs in the basket. Thus, it would be highly desirable to have a new and improved method for enabling a more thorough and complete cleaning of the eggs or other delicate comestibles with little or no damage to the objects being cleaned.

The prior known wire basket is also used for transportation of a quantity of eggs stored therein. Damage to the eggs moving or bouncing against the wall of the wire basket can also result during the transportation or movement of the eggs.

Also, according to the prior known wire basket cleaning technique, the eggs moving about within the basket during cleaning or transportation can cause the wire basket to be bent out of shape by bending inwardly. Thus, the inside dimensions could be changed to cause fewer items to be stored, and even more importantly, the containers cannot be readily nested for storage.

Furthermore, the wires forming the basket can rust, and the rusty wires coming into contact with the comestibles stored therein are highly undesirable and unwanted. The rusty container being repeatedly subjected to a water spray can cause undesirable rust stains on floors or other supporting surfaces for the basket during storage. Moreover, the oxidized or severely corroded wire containers can become structurally fatigued and thus breakage can occur and damage to the contents.

Thus, it would be highly desirable to have a more thorough cleaning method which does not result in damage to the container, or the surrounding area, and which is safe for cleaning delicate comestibles.

SUMMARY OF THE INVENTION

Therefore, the principal object of the present invention is to provide a new and improved comestible cleaning process, which facilitates greatly the cleaning of delicate comestibles such as eggs to avoid or greatly reduce the possibility of breakage or damage during the cleaning process.

Briefly, the above and further objects of the present invention are realized by providing a new and improved comestible cleaning process, which enables the safe cleaning of delicate comestibles such as eggs, as well as to preclude the damage to the container for the comestibles.

A new and improved cleaning method and apparatus facilitates a more thorough cleaning of delicate comestibles such as eggs. The process includes using an open frame basket composed of thermoplastic or thermoset material to help prevent damage to the comestibles. The side wall of the basket has openings defined by axial and peripheral impact absorbing liquid-deflecting ribs. Once the comestibles to be cleaned are confined within the basket, a cleaning fluid under pressure is deflected from the ribs at the outer surface of the walls and into the openings to cause an agitation of the fluid to clean more thoroughly the comestibles confined therein. The side wall openings are critically dimensioned to be sufficiently small to retain the comestibles within the basket and sufficiently large to permit adequate agitation of the fluid entering the basket.

One of the advantages of the present invention is that by using plastic material for the container, the use of a variety of different cleaning solutions may be employed.

Further advantages relate to the use of the light weight container for gathering the products to be cleaned by manually carrying the filled container. Also, during the transportation of the delicate products such as eggs, impact against the container walls is greatly lessened and thus damage or breakage is greatly reduced. Moreover, by using the novel plastic container, the food products can be cleaned and then stored safely without the risk of rusty wires coming into contact with clean food products.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
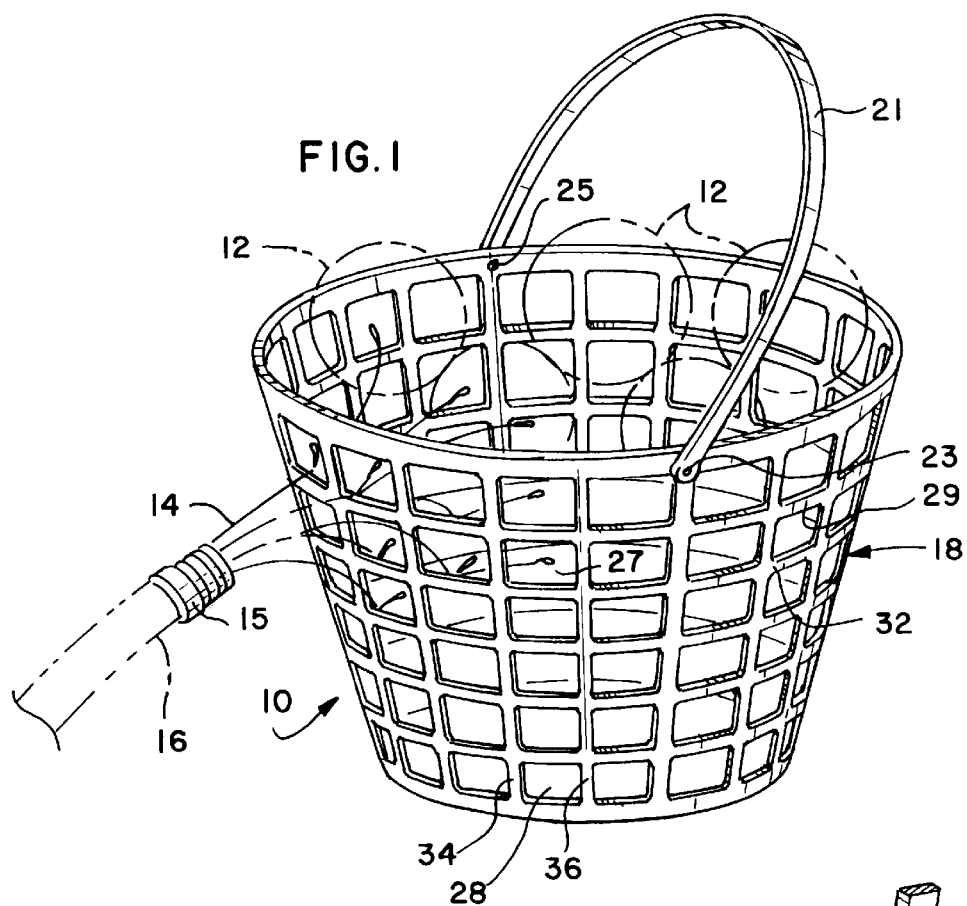
FIG. 1 is a pictorial view illustrating the comestible cleaning process in accordance with the present invention.
Figure 2:
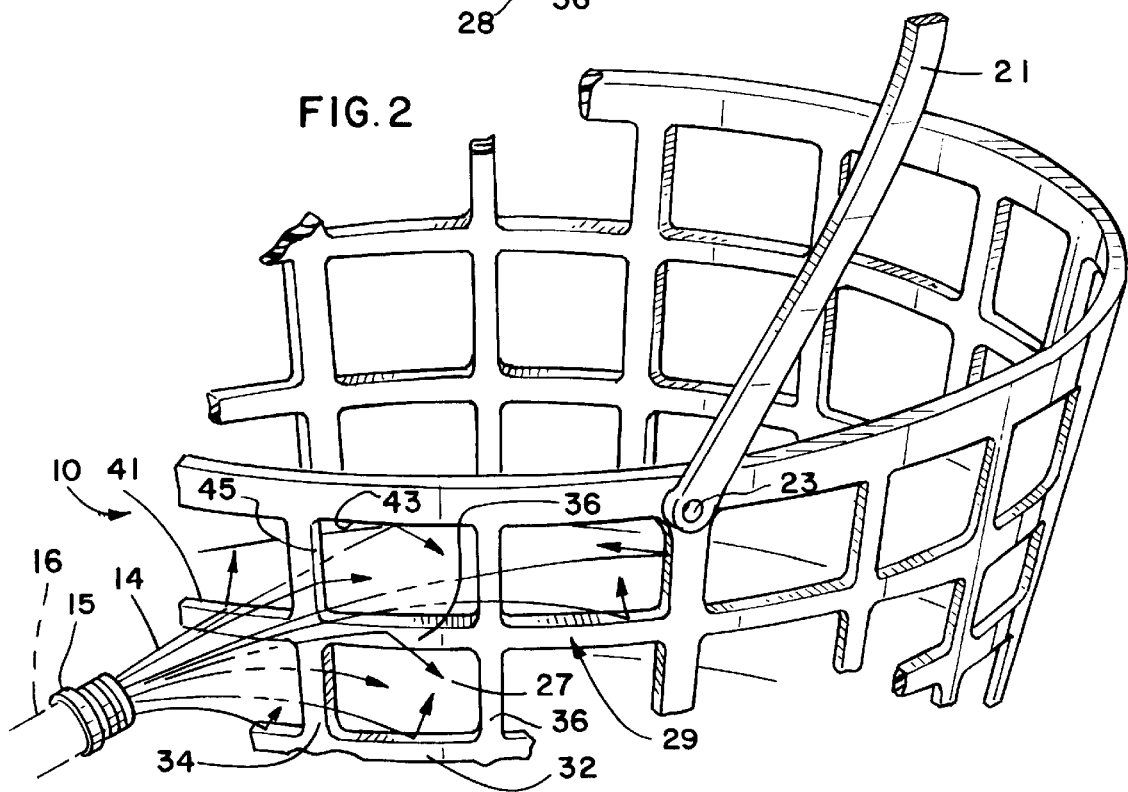
FIG. 2 is an enlarged view of the comestible cleaning process of FIG. 1, illustrating the basket in an enlarged scale with portions broken away for sake of clarity.

Referring now to the drawings, and more particularly to FIGS. 1 and 2 thereof, there is shown a method of cleaning comestibles, such as eggs in accordance with the present invention. The inventive method or process includes using an open frame basket 10 composed of thermoplastic or thermoset material for confining the comestibles such as eggs 12 for transportation and cleaning thereof. It should be understood that while eggs are shown and described herein, it will become apparent to those skilled in the art that other kinds of delicate comestibles may also be cleaned according to the inventive method. For example, vegetables or ripe fruit such as peaches can be readily cleaned in a safe and effective manner according to the present invention. It should be understood that various different comestibles which are less susceptible to damage can also be readily and effectively cleaned according to the present invention.

In accordance with the method of the present invention, water 14 under pressure flowing from an outlet 15 of a hose 16 or the like is directed against a side wall 18 of the basket 10 having openings such as the generally rectangular opening 27 therein to admit the fluid under pressure into the interior of the basket 10 for cleaning the comestibles. The open top basket 10 includes a U-shaped bail or handle 21 pivotally attached at 23 and 25 at the rim of the basket 10 to facilitate carrying of the basket and its contents for transportation of the comestibles as well as supporting the basket 10 during the cleaning process of the present invention.

The rectangular openings, such as the rectangular opening 27 are formed by a series of circular or annular spaced-apart peripheral fluid-deflecting ribs such as the ribs 29 and 32 which help define the openings, such as the rectangular opening 27. A series of axially extending spaced-apart impact-absorbing fluid-deflecting ribs, such as the ribs 34 and 36 help define the openings, such as the opening 27.

As best seen in FIG. 2, during the cleaning process of the present invention, the cleaning fluid 14, such as water, is deflected from the ribs, such as the ribs 29, 32, 34, and 36, at the outer surface of the side wall 18 to cause an agitation of the fluid for more thorough cleaning action.

The bottom wall (not shown) of the basket 10 is also provided with openings (not shown) therein for draining the cleaning fluid 14 from the interior of the basket 10 to permit carrying debris away from the eggs 12. The openings are sized to permit drainage and yet to retain the contents within the basket 10.

The side cleaning openings, such as the opening 27 in the side wall 18 are critically dimensioned. In this regard, the openings, such as the opening 27 is sufficiently small to confine the eggs or other comestibles within the basket 10 and have an adequate number of ribs to absorb the impact from the fluid under pressure. The openings are sufficiently large to permit adequate agitation of the fluid during the cleaning process. It has been found that the smallest size tapered basket has a height dimension of about 5.04 inches with a top diameter dimension at the rim of 6.60 inches and a base or bottom wall diameter dimension of 4.37 inches. The smallest openings, such as an opening 28 (FIG. 1), each have a top width dimension of about 0.55 inch, a bottom width dimension of about 0.50 inch and a height dimension of about 0.93 inch. Thus, the area of the smallest opening is about 0.488 square inch. The dimensions of the impact-absorbing fluid-deflecting ribs include an axial width dimension of about 0.17 inch and a radial depth dimension of about 0.16 inch.

It is understood that the basket 10 preferably has a decreased diameter from top to bottom to provide a tapered configuration. However, it will become apparent to those skilled in the art that a basket may be used in accordance with the inventive method having a uniform cross sectional area.

The largest size basket suitable for the process of the present invention has a height dimension of about 11.27 inches, a top diameter dimension of about 16.16 inches and a base or bottom wall dimension diameter of about 10.40 inches. The largest side cleaning opening of the largest size basket suitable for the present invention has a top width dimension of about 2.10 inches, a bottom width dimension of about 2.05 inches and a height dimension of about 1.30 inches. Thus, the area of the largest opening is about 2.718 square inches. The axial width dimension of the impact-absorbing fluid-deflecting ribs is about 0.21 inch. The ribs have a radial depth dimension of about 0.25 inch.

By employing a basket of the foregoing critical dimensions, adequate protection is provided for the eggs 12 during cleaning and transportation. In this regard, it has been found that there is a critical range of areas of openings between about 0.488 square inch and about 2.718 square inches to provide adequate protection for its delicate contents, and permits gentle and yet thorough cleaning according to the method of the present invention. Also, the eggs 12 are thoroughly washed, since they are not unduly compacted and inaccessible to the cleaning fluid under pressure.

The basket 10 utilized in accordance with the process of the present invention is preferably composed of a thermoplastic material, such as nylon, polypropylene, or other suitable material having a range of durometers of between about D50 and about D85. In this manner, the plastic material is sufficiently rigid to withstand the pressure of the fluid 14 without becoming damaged or deformed, and yet sufficiently soft to prevent, or at least greatly reduce, the possibility of damage or breakage of the delicate comestibles, such as the eggs 12, by absorbing the impact of the pressure from the cleaning fluid 14. Also, the thermoplastic material is sufficiently rigid to prevent the ribs from deforming inwardly and thereby damaging the eggs 12 during cleaning and transporting them.

Also, the basket 10 is not subject to rusting or otherwise deteriorating, and thus remains in a sanitary condition for food products, even after considerable use.

In accordance with the present invention, eggs 12 are gathered and placed in the basket 10 where they are then confined therein as shown in FIG. 1. The fluid (water) 14 under pressure is then directed from the outlet 15 of the hose 16 at an oblique angle toward the outer surface of the open side wall 18.

As best seen in FIG. 2, due to the thickness and placement of the ribs of the basket 10, fluid is admitted to the interior of the basket 10 through the side cleaning openings, such as the opening 27. In this regard, as best seen in FIG. 2, some fluid flows directly through the openings at an angle thereto for striking the eggs 12 at an oblique angle. Other portions of the fluid flow are deflected angularly from the outer face impact absorbing and deflecting surface of the ribs such as an outer face surface 38 of the peripheral rib 29. Fluid also strikes the ribs at their upper edges such as the upper impact absorbing and deflecting surface 41, and at their lower edges such as the lower edge impact absorbing and deflecting surface 43. Also, fluid strikes rib side edge impact absorbing and deflecting surfaces such as the side edge surface 45 of the rib 34. As a result, fluid movement causes an agitation to occur to more completely and effectively clean the confined eggs 12.

The impact of the fluid striking the ribs is absorbed by the ribs, and thus the fluid is deflected against the eggs 12 in an agitated, but less forceful, manner as indicated in FIG. 2. This agitation is highly effective in dislodging debris from the eggs, without damaging their delicate shells.

While particular embodiments of the present invention have been disclosed, it is to be understood that various different modifications are possible and are contemplated within the true spirit and scope of the appended claims. For example, while generally rectangular openings are preferred, other shapes and configurations of openings such as square, triangular, radiused and others may be employed. Similarly, the cross sectional shape and configuration of the ribs can be modified by those skilled in the art in a similar manner as mentioned regarding how the openings may be modified. Also, while the cross sectional shape of the container is preferred to be circular, other shapes and configurations may also be employed such, for example, as rectangular, square, polygonally-shaped, and other shapes and configurations. There is no intention, therefore, of limitations to the exact abstract or disclosure herein presented.

What is claimed is:

1. A method of cleaning delicate comestibles that facilitates cleaning while reducing breakage or damage during the cleaning process, comprising:

using an open frame basket being composed of plastic material and having a side wall, the side wall having openings defined by axial peripheral thick liquid-deflecting ribs having a lower and upper edge and axial extending peripheral liquid deflecting thick ribs having side edges, each one of said ribs having substantial axial thickness of between about 0.16 inch and about 0.25 inch to provide impact absorbing and deflecting surfaces;

each one of said openings having an area of between about 0.488 square inch and about 2.718 square inches to confine the comestibles within the basket and to provide for cleaning openings to enable gentle, thorough cleaning of the comestibles;

confining comestibles to be cleaned within the basket;

directing a cleaning fluid under pressure at an oblique angle relative to the basket side wall;

admitting to the interior of the basket some portion of the fluid directly through openings at an angle thereto for striking the comestibles at an oblique angle relative thereto; and deflecting another portion of the cleaning fluid under pressure from the thickness and depth of the ribs at the outer surface of the walls and into the openings to cause an agitation of the fluid to clean thoroughly the comestibles confined therein in a safe manner, said deflecting including directing fluid against the lower and upper edges of axial ribs and directing fluid against side edges of axial extending ribs.

2. A method according to claim 1, wherein said basket has a height of between about 5.04 and about 11.27 inches, and a diameter of between about 4.37 inches and about 10.40 inches.

3. A method according to claim 2, wherein said basket is composed of thermoset material.

4. A method according to claim 3, wherein said basket has a durometer of between about D50 and about D85.

5. A method according to claim 2, wherein said basket is composed of thermoplastic material.

6. A method according to claim 1, further including draining fluid from the basket via its opening and retaining the cleaned comestibles within the basket.

7. A method according to claim 6, further including transporting the basket containing the cleaned comestibles.

* * * * *